(12) United States Patent
Kim

(10) Patent No.: US 12,459,387 B2
(45) Date of Patent: Nov. 4, 2025

(54) CHARGING SYSTEM FOR ELECTRIC BUS AND CHARGING METHOD USING THE SAME

(71) Applicants: HYUNDAI MOTOR COMPANY, Seoul (KR); KIA MOTORS CORPORATION, Seoul (KR)

(72) Inventor: Duk Joo Kim, Jeonju-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 479 days.

(21) Appl. No.: 16/900,320

(22) Filed: Jun. 12, 2020

(65) Prior Publication Data

US 2021/0237601 A1 Aug. 5, 2021

(30) Foreign Application Priority Data

Feb. 4, 2020 (KR) .................. 10-2020-0012897

(51) Int. Cl.
*B60L 53/36* (2019.01)
*B60L 53/37* (2019.01)
(Continued)

(52) U.S. Cl.
CPC ............... *B60L 53/36* (2019.02); *B60L 53/37* (2019.02); *G01C 21/3661* (2013.01);
(Continued)

(58) Field of Classification Search
CPC ...... B60L 53/36; B60L 53/37; B60L 2200/18; G01C 21/3661; H02J 7/007; H02J 2207/20; G01S 19/42
See application file for complete search history.

(56) References Cited

U.S. PATENT DOCUMENTS 3,955,657 A * 5/1976 Bossi ....................... B60M 1/36
191/29 R
5,821,731 A 10/1998 Kuki et al.
(Continued)

FOREIGN PATENT DOCUMENTS

CN 105391183 A 3/2016
CN 106183843 A 12/2016
(Continued)

OTHER PUBLICATIONS

Ho et al., KR101974070B1 English translation, Apr. 2019 (Year: 2019).*

(Continued)

*Primary Examiner* — Drew A Dunn
*Assistant Examiner* — Pamela J Jeppson
(74) *Attorney, Agent, or Firm* — MORGAN, LEWIS & BOCKIUS LLP

(57) ABSTRACT

A charging system includes: a power converter configured to receive power from an external power network to generate charging power for electric buses; power rails electrically connected to the power converter and installed at a predetermined height according to a layout of a garage; a first charging network configured to horizontally move above a floor in the garage along the electric power rails to upper sides of the electric buses to contact the electric buses; a second charging network electrically connected to the power converter and providing a charging zone on a bottom surface of the garage by reflecting the layout to contact the electric buses parked in the charging zone; and a station controller configured to control a charging sequence of the electric buses by analyzing position information of the electric buses and calculating a shortest movement path and a charging order of the first charging network.

17 Claims, 6 Drawing Sheets

(51) Int. Cl.
*G01C 21/36* (2006.01)
*H02J 7/00* (2006.01)
*G01S 19/42* (2010.01)

(52) U.S. Cl.
CPC ........... *H02J 7/007* (2013.01); *B60L 2200/18* (2013.01); *G01S 19/42* (2013.01); *H02J 2207/20* (2020.01)

(56) References Cited

U.S. PATENT DOCUMENTS

| | | | | |
|---|---|---|---|---|
| 6,864,598 | B2* | 3/2005 | Nogaret | B60L 9/22 307/10.1 |
| 2007/0062771 | A1* | 3/2007 | Li | B60L 5/18 191/50 |
| 2011/0030574 | A1* | 2/2011 | Kitanaka | B60L 50/53 105/49 |
| 2012/0091959 | A1* | 4/2012 | Martin | B60L 53/51 320/109 |
| 2014/0354229 | A1 | 12/2014 | Zhao et al. | |
| 2016/0023564 | A1 | 1/2016 | Warner et al. | |
| 2016/0185227 | A1 | 6/2016 | Pachler | |
| 2016/0362011 | A1 | 12/2016 | Weigel et al. | |
| 2017/0050527 | A1 | 2/2017 | Tsuchiya | |
| 2017/0136904 | A1 | 5/2017 | Ricci | |
| 2018/0015836 | A1* | 1/2018 | Madon | B60L 53/65 |
| 2018/0056801 | A1* | 3/2018 | Leary | B60L 53/305 |
| 2020/0207238 | A1* | 7/2020 | Jones | B60M 1/30 |

FOREIGN PATENT DOCUMENTS

| | | | |
|---|---|---|---|
| CN | 107933324 A | 4/2018 | |
| CN | 209566797 U | 11/2019 | |
| DE | 2405198 A1 | 8/1974 | |
| DE | 102017004396 A1 * | 11/2017 | |
| EP | 2962891 A1 | 1/2016 | |
| EP | 3031658 A1 | 6/2016 | |
| EP | 3064393 A1 | 9/2016 | |
| JP | 2012-80628 A | 4/2012 | |
| KR | 10-2014-0116644 A | 10/2014 | |
| KR | 10-2018-0032892 A | 4/2018 | |
| KR | 101974070 B1 * | 4/2019 | ........... B60L 3/0015 |

OTHER PUBLICATIONS

Hager DE-102017004396-A1 Machine Translation (Year: 2017).*
Office Action issued Sep. 8, 2023 for corresponding Chinese Patent Application No. 202010770317.9 (See English Translation).
Li, et al., "Research on the Current Collection of Two Pantographs of Chongqing As Type Metro Line 5", 2019, Railway Locomotive & Car, vol. 39, 5 pages total (See English Abstract).

* cited by examiner

CHARGING SYSTEM FOR ELECTRIC BUS AND CHARGING METHOD USING THE SAME

CROSS-REFERENCE TO RELATED APPLICATION

This application claims priority to and benefits of Korean Patent Application No. 10-2020-0012897, filed in the Korean Intellectual Property Office on Feb. 4, 2020, the entire contents of which are incorporated herein by reference.

TECHNICAL FIELD

The present disclosure relates to a system for charging a plurality of electric buses parked in a narrow place, and a charging method using the same.

BACKGROUND

As an essential means of human life and social activities, a vehicle is moved by means of fossil energy such as gasoline as an energy source. However, fossil energy is a depleted resource with a limited amount of time, and its price is continuously rising. In addition, fossil energy not only emits various exhaust gases that pollute the atmosphere during its use, but also emits large amounts of carbon dioxide, which is a major cause of global warming, and thus countries around the world are conducting various R & D activities to reduce carbon dioxide emissions in all industries, and as an alternative, electric vehicles that use electricity as energy sources have been developed.

In order to expand the distribution of electric vehicles, it is essential to build a charging infrastructure for charging electric vehicles' electric batteries. In particular, the difficulty in building a charging station is considered to be a big obstacle in the expansion of electric buses.

Specifically, transportation companies in many countries, such as Korea, have very narrow spaces for their garages, and semi-public managed garages are not much different. In addition, it is difficult for buses to park regularly because various obstacles are located in a narrow garage space, and a parking direction is also irregular in order to secure vehicle access.

Most electric buses currently in use have a 'Plug-In Type' charging method, and in the case of the Plug-In Type, a charger is located on the ground and there are thick and long cables for charging, so it is difficult to install it sufficiently in the narrow garage space.

As a result, it is urgently needed to develop a charging station capable of efficiently charging a plurality of electric buses in a narrow place such as a bus garage.

The above information disclosed in this Background section is only for enhancement of understanding of the background and therefore it may contain information that does not form the prior art that is already known in this country to a person of ordinary skill in the art.

SUMMARY

The present disclosure has been made in an effort to provide a charging system for an electric bus and a charging method using the same, capable of charging a parked electric bus by allowing the network system to move over the parked electric bus along a power rail even when a plurality of electric buses are irregularly parked or parking directions are different.

The present specification has been made in an effort to provide a charging system for an electric bus and a charging method using the same, capable of being customized to be installed on a garage layout.

An exemplary embodiment of the present disclosure provides a charging system for an electric bus, including: a power converter configured to receive power from an external power network to generate charging power for a plurality of electric buses; a plurality of power rails electrically connected to the power converter and installed at a predetermined height according to a layout of a garage; a first charging network configured to horizontally move above a floor in the garage along the electric power rails to an upper side of the electric bus to contact the electric buses; a second charging network electrically connected to the power converter and providing a charging zone on a bottom surface of the garage by reflecting the layout of the garage to contact the electric buses parked in the charging zone; and a station controller configured to control a charging sequence of the electric buses by analyzing position information of the electric buses and calculating a shortest movement path and a charging order of the first charging network.

The first charging network may be configured to have a predetermined area, and opposite ends thereof are electrically connected to a pair of power rails installed at a predetermined height at opposite positions, respectively, to horizontally move above the floor in the garage opposite to the second charging network.

The station controller may display position information of the electric buses on a garage map, and compares the garage map with a map of the second charging network to determine a possibility of charging of the electric buses.

The station controller may transfer a parking position adjustment signal to at least one of the electric buses when the at least one electric bus is not chargeable.

The first charging network may include a plurality of first charging networks, and when the electric buses are chargeable, the station controller may analyze a position of the first charging networks and position information of the electric buses to calculate a shortest movement path of each of the plurality of first charging networks, and may match at least one electric bus parked below the shortest movement path to calculate the charging order of each of the first charging networks.

The station controller may transfer a charging start control signal to the electric bus to induce a first pantograph of the electric bus to expand upward to contact the first charging network and a second pantograph of the electric bus to extend downward to contact the second charging network.

The station controller may correct a position by moving the first charging network when it is determined that the first charging network and the first pantograph fail to contact each other.

The station controller may induce the parking position of the electric bus to be corrected by transmitting a parking position adjustment signal to the electric bus when it is determined that the second charging network and the second pantograph fail to contact each other.

The station controller may control the charging power to be received by the electric bus by transferring a charge control signal to the power converter when it is determined that the contact between the first pantograph and the first charging network and the contact between the second pantograph and the second charging network are successfully made.

An exemplary embodiment of the present disclosure provides a charging system for an electric bus, including: a first pantograph configured to extend upward from an upper side of a roof to contact a first charging network of a charging station; a second pantograph configured to extend downward from an outer bottom surface to contact a second charging network of the charging station during charging; a position sensor configured to generate position information of the electric bus; a bus communication module configured to communicate with a charging station to transmit the position information to the charging station; and a bus controller configured to transmit the position information through the bus communication module for charging and to control the first pantograph and the second pantograph depending on a control signal received from the charging station to charge a battery of the electric bus when the electric bus is parked.

The bus controller may control the electric bus to be parked in the second charging network when the electric bus is not parked in the second charging network and a parking position adjustment signal from the charging station is received.

An exemplary embodiment of the present disclosure provides a charging method for an electric bus, including: receiving position information from a plurality of electric buses parked in a garage; determining whether the electric buses are parked and are chargeable in a second charging network based on the position information; calculating a charging order of each of a plurality of first charging networks depending on a result of the determining whether the charging is possible, and controlling the first charging networks to move according to the calculated charging order; preparing for charging by transferring a charging start control signal to a corresponding electric bus among the plurality of electric buses to induce a first pantograph of the electric bus to expand upward to contact at least one of the first charging networks and a second pantograph of the corresponding electric bus to extend downward to contact a second charging network; starting charging by transferring a charge control signal to a power converter so that charging power is received by the corresponding electric bus when contacts of the first pantograph and the second pantograph are made; and ending the charging by transferring a charging end control signal to the corresponding electric bus to control the first pantograph and the second pantograph to be respectively separated from the one of the first charging networks and the second charging network when the charging is completed.

The determining may include displaying the position information of the plurality of electric buses on a garage map and comparing the garage map with a map of the second charging network to determine a possibility of charging of the plurality of electric buses.

The determining may further include transmitting a parking position adjustment signal to at least one of the plurality of the electric buses when it is determined that the one electric bus is not chargeable.

The controlling of the first charging networks to move may include analyzing a position of the plurality of first charging networks and the position information of the plurality of electric buses to calculate a shortest movement path of each of the plurality of first charging networks, and matches at least one electric bus parked below the shortest movement path to calculate the charging order of each of the first charging networks.

The controlling of the plurality of first charging networks to move may include controlling the movement of the first charging networks such that the first pantograph of the electric bus is positioned under an area covered by the predetermined area of the plurality of first charging networks.

Before the starting of charging, the charging method may further include determining whether the one of the first charging networks and the second charging network successfully contact the first pantograph and the second pantograph, respectively.

The charging method may further include correction control for correcting a position by moving the one of the plurality of first charging networks when it is determined that the contact fails between the one of the plurality of first charging networks and the first pantograph in the determining.

The correction control may further include inducing the parking position of the electric bus to be corrected by transmitting a parking position adjustment signal to the electric bus when it is determined that the second charging network and the second pantograph fail to contact each other in the determining.

The present disclosure provides a charging system for an electric bus and a charging method using the same, capable of charging without additional movement or direction change of a plurality of electric buses, even when each of the electric buses is parked differently and irregularly.

The present disclosure provides a charging system for an electric bus and a charging method using the same, capable of being installed in an irregular and confined space by arranging a power rail according to a garage layout and minimizing ground space for installing a charging station.

DETAILED DESCRIPTION OF THE EMBODIMENTS

Figure 1:
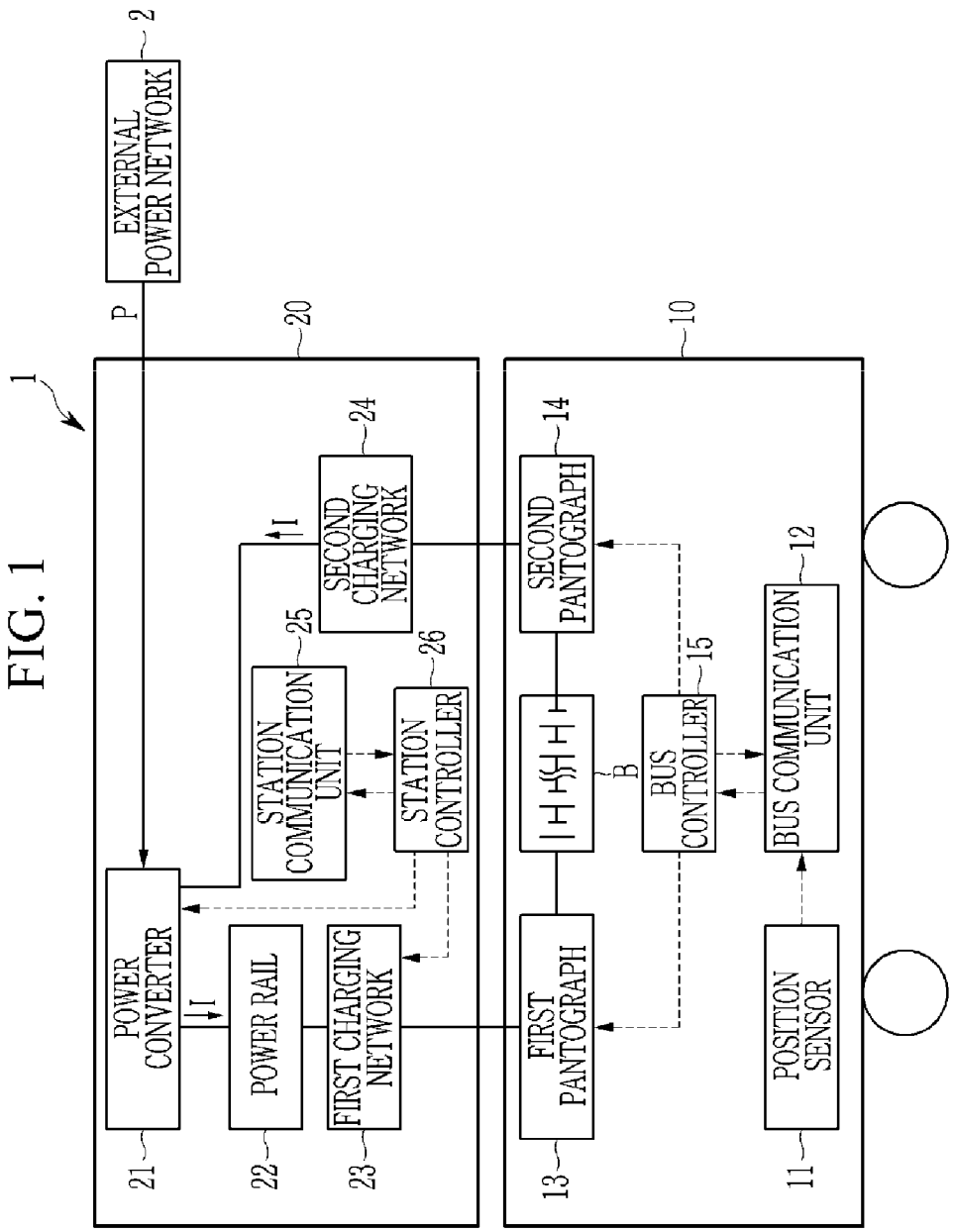
FIG. 1 illustrates a block diagram of a charging system for an electric bus according to an exemplary embodiment.

Hereinafter, exemplary embodiments disclosed in the present specification will be described in detail with reference to the accompanying drawings. In the present specification, the same or similar components will be denoted by the same or similar reference numerals, and a repeated description thereof will be omitted. Terms "module" and/or "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present disclosure may obscure the gist of the present disclosure, it will be omitted. The accompanying drawings are provided only in order to allow exemplary embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprises" and "have" used in the present specification specify the presence of stated features, numerals, steps, operations, components, parts, or combinations thereof, but do not preclude the presence or addition of one or more other features, numerals, steps, operations, components, parts, or combinations thereof.

Figure 2:
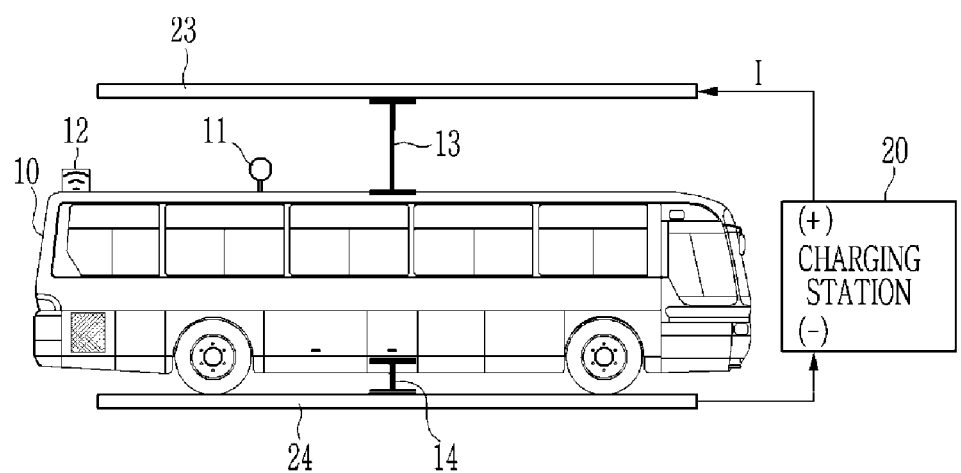
FIG. 2 illustrates a conceptual view of the electric bus of FIG. 1.
Figure 3:
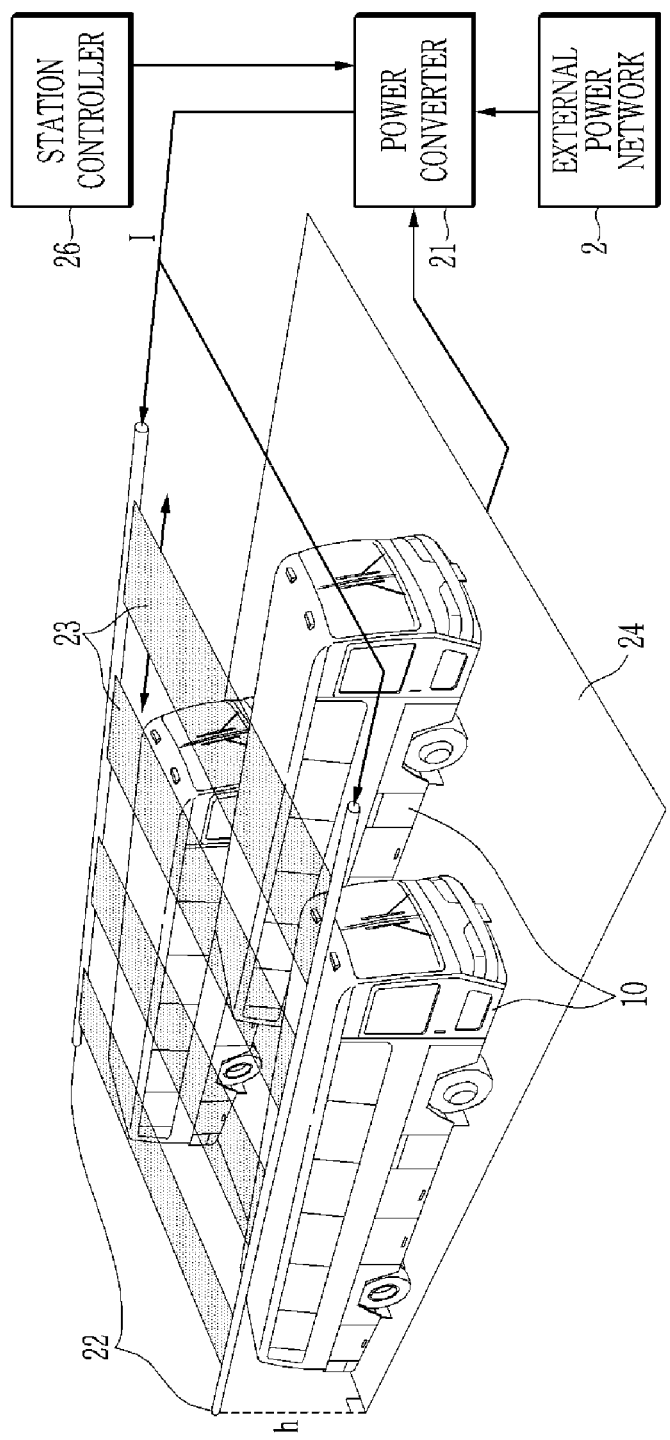
FIG. 3 illustrates a conceptual view of a charging station of FIG. 1.
Figure 4:
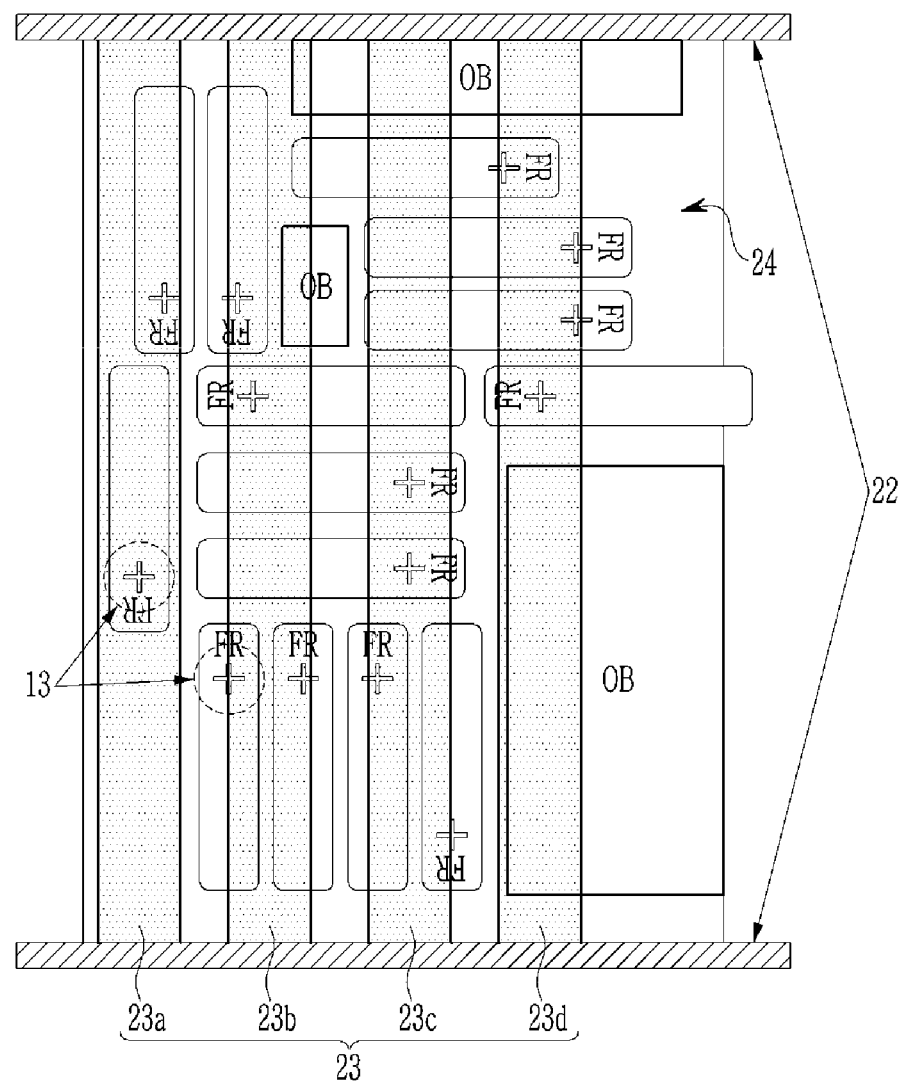
FIG. 4 and FIG. 5 illustrate views for describing a layout of a charging station that is installed according to a garage layout.
Figure 5:
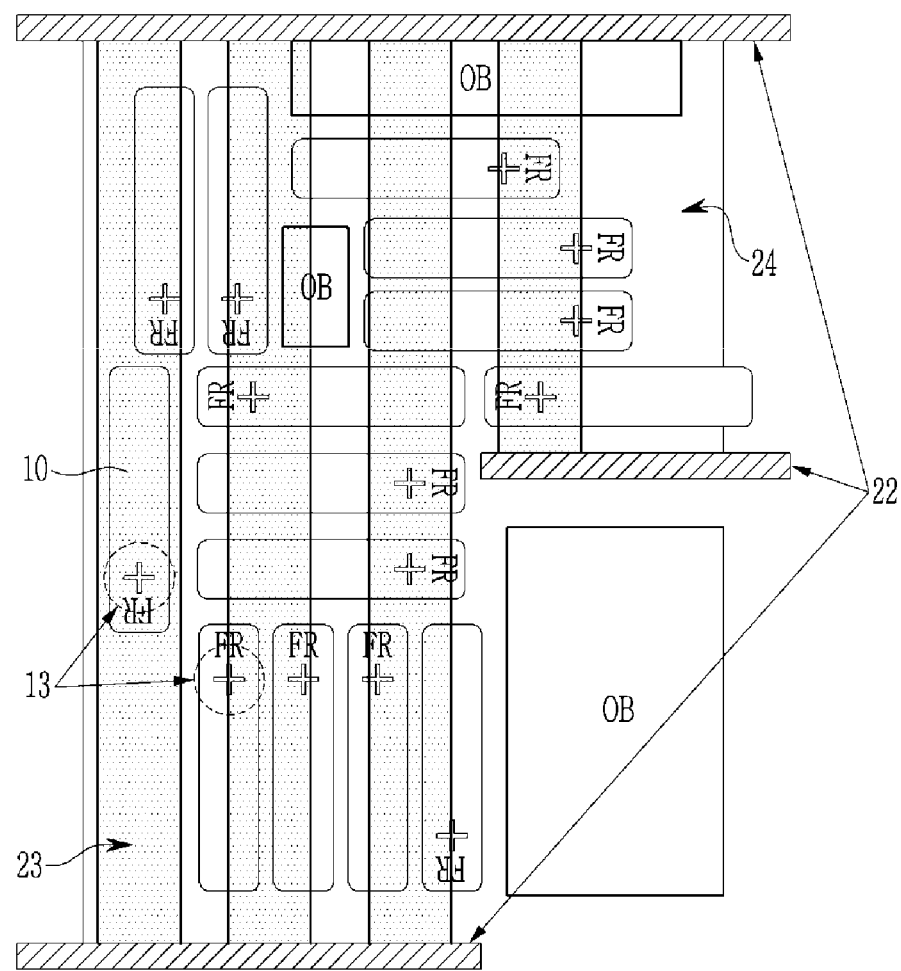

FIG. 1 illustrates a block diagram of a charging system for an electric bus according to an exemplary embodiment, FIG. 2 illustrates a conceptual view of the electric bus of FIG. 1, FIG. 3 illustrates a conceptual view of a charging station of FIG. 1, and FIG. 4 and FIG. 5 illustrate views for describing a layout of a charging station that is installed according to a garage layout.

Referring to FIG. 1, the charging system 1 for an electric bus includes an electric bus 10 and a charging station 20. In FIG. 1, a solid line indicates a power supply path, and a dotted line indicates a communication path.

In the present disclosure, the electric bus 10 includes a pure electric bus, a pure electric vehicle, a plug-in hybrid, or a moving vehicle that uses charging energy. The charging station 20 includes associated equipment provided for charging an electric vehicle EV or the like.

The electric bus 10 includes a position sensor 11, a bus communication module 12 which may include a bus communication circuit, a first pantograph 13, a second pantograph 14, and a bus controller 15.

The position sensor 11 may measure a current position of the electric bus 10 in real time or at predetermined time intervals. For example, the position sensor 11 may include a GPS module that receives current position information of the electric bus 10 from a plurality of GPS satellites in real time, and may transmit information regarding a measured position (hereinafter, position information) to the charging station 20 through the bus communication module 12.

The bus communication module 12 communicates with the charging station 20 to transmit position information of the electric bus 10 and a preparation completion signal, or receives a parking position adjustment signal, a charging start control signal, and a charging end control signal to transmit them to the bus controller 15. For example, the bus communication module 12 may include at least one of a short range wireless communication module, a network connection module, a mobile communication module, or a wireless Internet module to communicate with the charging station 20.

The short range wireless communication module may be connected to the charging station 20 to enable data communication via Bluetooth, and may store information necessary for connection in a memory. The network communication module may be connected to the charging station 20 to enable data communication via WiFi, and may store information necessary for connection in a memory. The mobile communication module may transmit or receive a wireless signal with respect to at least one of a base station, an external terminal, or a server in a mobile communication network. The wireless signal may include various types of data according to a voice call signal, a video call signal, or a text/multimedia message transmission and reception. The wireless Internet module may be built in or externally mounted to the bus communication module 12 as a module for wireless Internet connection. For example, the wireless Internet module may perform WiFi-based wireless communication or WiFi Direct-based wireless communication.

The first pantograph 13 is positioned in a roof of the electric bus 10 in a folded state while driving, and is upwardly unfolded to contact the charging station 20 when the charging is started. For example, the first pantograph 13 is upwardly unfolded to contact a positive electrode of the charging station 20 to receive charging power.

The second pantograph 14 is positioned in an external floor of the electric bus 10 in a folded state while driving, and is downwardly unfolded to contact the charging station 20 when the charging is started. For example, the second pantograph 14 is unfolded downward to contact a negative electrode of the charging station 20 so as to configure a closed loop path in which a charging current received from the charging station 20 can flow through the first pantograph 13.

The first pantograph 13 and the second pantograph 14 are one type of current collectors used to receive power from the outside. The pantograph may be called a pantograph, or abbreviated as a fan or fanto. Conventional pantographs have been used mainly for supplying power to railroad vehicles that do not depend on batteries.

In an exemplary embodiment, the first pantograph 13 and the second pantograph 14 respectively contact the positive and negative electrodes of the charging station 20 to charge a battery B of the electric bus 10 during the night after operation of the electric bus 10 ends and it is parked in a garage. When the charging is complete, the first pantograph 13 and second pantograph 14 are separated from the charging station 20 and enter a folded state. Since the first pantograph 13 and the second pantograph 14 are in a folded state except for the charging time, air friction during operation of the electric bus 10 may be reduced.

The bus controller 15 controls the first pantograph 13 and the second pantograph 14 depending on a control signal of the charging station 20 to charge the electric bus 10. For example, when the electric bus 10 cannot be charged at a current parking position, the bus controller 15 displays a parking position adjustment signal received from the charging station 20 to a manager so as to guide the electric bus 10 to move to a chargeable position.

First, the bus controller 15 transmits position information collected by the position sensor 11 to the charging station 20 through the bus communication module 12 when the electric bus 10 is parked in the garage.

Next, when the charging of the electric bus 10 is impossible at the current parking position and it receives the parking position adjustment signal from the charging station 20, the bus controller 15 displays the received parking position adjustment signal to the manager. Then, the electric bus 10 may be moved to a chargeable position by a method such as driving by an administrator or autonomous driving.

Next, when the electric bus 10 can be charged at a new parking position and the charging start control signal is received from the charging station 20, the bus controller 15 may control the first pantograph 13 and the second pantograph 14 to be unfolded.

Referring to FIG. 2, the first pantograph 13 is unfolded upward to contact the positive electrode of the charging station 20, and the second pantograph 14 is unfolded downward to contact the negative electrode of the charging station 20.

Next, when each of the first pantograph 13 and the second pantograph 14 contacts the charging station 20, the bus controller 15 may transmit the preparation completion signal to the charging station 20.

Subsequently, the bus controller 15 controls the first pantograph 13 and the second pantograph 14, which are unfolded, to be folded when the charge end control signal is received from the charging station 20. The first pantograph 13 is then folded apart from the positive electrode of the charging station 20, and is positioned in the roof of the electric bus 10. The second pantograph 14 is then folded apart from the negative electrode of the charging station 20, and is positioned in the external floor of the electric bus 10.

The charging station 20 includes a power converter 21, a power rail 22, a first charging network 23, a second charging network 24, a station communication module 25 which may include a station communication circuit, and a station controller 26.

The power converter 21 receives commercial AC power from an external power network 2 (see FIG. 1) and rectifies the AC power to DC power, and generates charging power for charging the battery B of the electric bus 10 by stepping the rectified DC power up or down.

The commercial AC power may be a single-phase AC power that can be used for home or commercial purposes. As an example, in Korea, the commercial voltage is generally single-phase AC 220 V, and the voltage may vary depending on the country, but may be within a range of 85~265 V. In addition, the frequency is generally 60 Hz, or may be 50 Hz. The commercial AC power is generated by the external power network 2, and the battery B may be supplied with power of, e.g., about 3 to 6 kW.

The battery B is a power source of the electric bus 10, and is implemented as a rechargeable battery, generally a lithium-ion battery, that is capable of repeatedly charging and discharging electrical energy. The battery B is configured by stacking cells in series therein, and has a high voltage in a range of about 240 to 413 V depending on a state of charge. Hereinafter, a content of "charging the electric bus 10" corresponds to a content of "charging a battery of the electric bus 10".

The power rail 22 is connected to a positive electrode of the power converter 21 to transfer the charging power transferred from the power converter 21 to the first charging network 23. Referring to FIG. 3, when the station controller 26 detects that the first charging network 23 is in contact with the electric bus 10 and transfers a charging control signal to the power converter 21, the charging power is supplied to the electric bus 10 through the first charging network 23 connected to the power rail 22.

The power rail 22 provides a horizontal movement path of the first charging network 23. The first charging network 23 moving along the power rail 22 may be positioned above the electric bus 10 that needs to be charged to charge the electric bus 10. In this case, the garage is not limited to the bus garage, and includes a charging place where a battery charging station of a moving body that is driven by using charging energy such as an electric vehicle is installed.

A plurality of power rails 22 are installed at a predetermined height h near an outer circumference of the garage or obstacles positioned in the garage, depending on a layout of the garage according to obstacles, charging equipment, and the like. For example, the power rail 22 is implemented at the predetermined height h such that the first charging network 23 can move over the electric bus 10.

Referring to FIG. 4, a plurality of obstacles OB are sporadically positioned in a narrow garage so that a plurality of electric buses 10 are parked in a parking direction without regularity. For example, a pair of power rails 22 are oppositely installed at an outer side of the garage, and opposite ends of a plurality of first charging networks 23a, 23b, 23c, and 23d are respectively connected to the pair of power rails 22.

Referring to FIG. 5, a plurality of obstacles OB are sporadically positioned in a narrow garage so that a plurality of electric buses 10 are parked in a parking direction without regularity. For example, a plurality of power rails 22 are installed near the outer side of the garage and the obstacles OB, and opposite ends of the first charging network 23 are respectively connected to corresponding power rails 22 of the plurality of power rails 22.

A conventional charging station of the electric bus 10 is installed at a specific position of the garage, and thus it was necessary for the electric bus 10 to move to the vicinity of the charging station for charging. Such a restriction causes a problem that charging is impossible when a plurality of electric buses 10 are closely parked in a narrow space and are difficult to move. According to the present exemplary embodiment, the first charging networks 23 can move along the power rails 22 over the electric buses 10 to charge them, and thus the electric buses 10 can be charged when the garage is narrow and the obstacles prevent the electric buses 10 from moving in the garage.

The first charging network 23 horizontally moves over the garage along the power rails 22 and contacts the first pantograph 13 positioned above the electric bus 10 parked in the garage to supply charging power to the electric bus 10. For example, the first charging network 23 is formed to have a plurality of quadrangles having a predetermined area, and the plurality of first charging networks 23 move over the garage opposite to a second charging network 24 having a predetermined area on a bottom surface of the garage.

Referring to FIG. 2 and FIG. 3, opposite ends of the first charging network 23 are electrically connected to the pair of power rails 22, and a predetermined area portion of the first charging network 23 is in contact with the first pantograph 13 positioned above the electric bus 10. Then, the charging power supplied from the power converter 21 is transferred to the first pantograph 13 along the power rails 22 and the first charging network 23.

Referring to FIG. 4 and FIG. 5, the first pantograph 13 of most parked electric buses 10 is positioned below an area covered by predetermined areas of the plurality of first charging networks 23a, 23b, 23c, and 23d or below a movement path. The station controller 26 calculates a shortest movement path and a charging order of each of the plurality of first charging networks 23a, 23b, 23c, and 23d. Then, each of the plurality of first charging networks 23a, 23b, 23c, and 23d moves along the calculated shortest movement path and contacts the electric bus 10 positioned below the area covered by the predetermined areas, thereby contacting and charging the electric bus.

The second charging network 24 constitutes a closed loop path through which the charging current received from the first charging network 23 can flow due to the contact of the first pantograph 13 by contacting the second pantograph 14 positioned below the electric bus 10 parked in a charging zone. For example, the electric bus 10 may be charged only when parked in the charging zone constituting the second charging network 24.

Referring to FIG. 2 and FIG. 3, the second charging network 24 is in contact with the second pantograph 14 of the electric bus 10, and a first side thereof is connected to the negative electrode of the power converter 21. Then, the charging current received by the first pantograph 13 is transferred to the power converter 21 along the second pantograph 14 and the second charging network 24 after charging the battery B.

Referring to FIG. 4 and FIG. 5, the second charging network 24 may form a plurality of charging zones in an entire surface or a predetermined area of the bottom surface of the garage depending on a layout of the garage. As illustrated in FIG. 4, the second charging network 24 may form a charging zone on an entire surface of the garage including a position area of the obstacles OB. Alternatively, as illustrated in FIG. 5, the second charging network 24 may form a charging zone in a predetermined area of the garage except for the position area of the obstacles OB.

The station communication module 25 communicates with the electric bus 10 (FR) to receive position information and a preparation completion signal of the electric bus 10 to transmit to the station controller 26, or to transmit a parking position adjustment signal, a charging start control signal, and a charging end control signal to the electric bus 10. For example, the station communication module 25 may include at least one of a short range wireless communication module, a network connection module, a mobile communication module, or a wireless Internet module to communicate with the electric bus 10.

The station control unit 26 analyzes position information of the electric buses 10 parked in the garage, and calculates the shortest movement path of the first charging network 23 and a charging order, to control the charging sequence of the electric buses 10.

First, the station controller 26 receives position information from the electric buses 10 parked in the garage through the station communication module 25, and determines whether the electric bus 10 can be parked and charged in the second charging network 24. For example, the station controller 26 displays positions of the electric buses 10 on a garage map and compares it with a charging zone map to distinguish the electric bus 10 that is chargeable from the electric bus 10 that is not chargeable.

When the electric bus 10 is not chargeable, the station controller 26 transmits a parking position adjustment signal to the electric bus 10. Then, a driver or a manager who checks the parking position adjustment signal may move the electric bus 10 to the charging zone of the second charging network 24 to prepare for charging.

Next, when the electric bus 10 is chargeable, the station controller 26 analyzes positions of the first charging networks 23 (23a, 23b, 23c, and 23d) and the position information received from the electric buses 10 to calculate a shortest movement path of each of the first charging networks 23, and calculates the charging order of each of the first charging networks 23 by matching at least one electric bus 10 parked under the calculated shortest movement paths. In this case, when the first charging networks 23 need to be moved for charging, the station controller 26 controls the first charging networks 23 to move such that the first pantograph 13 of the electric bus 10 is positioned under the area covered by the predetermined areas of the first charging networks 23 according to the calculated charging order.

Next, the station controller 26 transfers a charging start control signal to the electric bus 10. Then, the electric bus 10 extends the first pantograph 13 upward to contact the first charging network 23, and extends the second pantograph 14 downward to contact the second charging network 24.

Next, the station control unit 26 determines whether contacts of the first pantograph 13 and the second pantograph 14 are successful. Specifically, the station controller 26 may check for itself whether the contacts of the first pantograph 13 and the second pantograph 14 are successfully made, or may receive ready signals corresponding to successful contacts of the first pantograph 13 and the second pantograph 14 from the electric bus 10.

Next, when the contacts of the first pantograph 13 and the second pantograph 14 fail, the station controller 26 performs a correction control.

For example, when the station controller 26 determines that the first charging networks 23 and the first pantograph 13 fail to contact each other, the station controller 26 controls the movement of the first charging network 23 to correct the position. When the station controller 26 determines that the second charging network 24 and the second pantograph 14 are not in contact with each other, the station controller 26 transfers a parking position adjustment signal to the electric bus 10 to correct the position by controlling the electric bus 10 to move.

Next, when the contacts of the first pantograph 13 and the second pantograph 14 are successfully made, the station control unit 26 transfers a charging control signal to the power converter 21 to start the charging by allowing the charging power to be transferred to the electric bus 10.

Next, when the charging is complete, the station controller 26 transmits a charging end control signal to the electric bus 10 to control the first pantograph 13 and second pantograph 14 to be respectively separated from the first charging network 23 and the second charging network 24.

Subsequently, the station controller 26 determines whether a next charging target electric bus 10 of the first charging network 23 exists. If present, the station controller 26 repeats the above from steps to control the movement of the first charging network 23 to the corresponding position. If not present, the charging ends.

Figure 6:
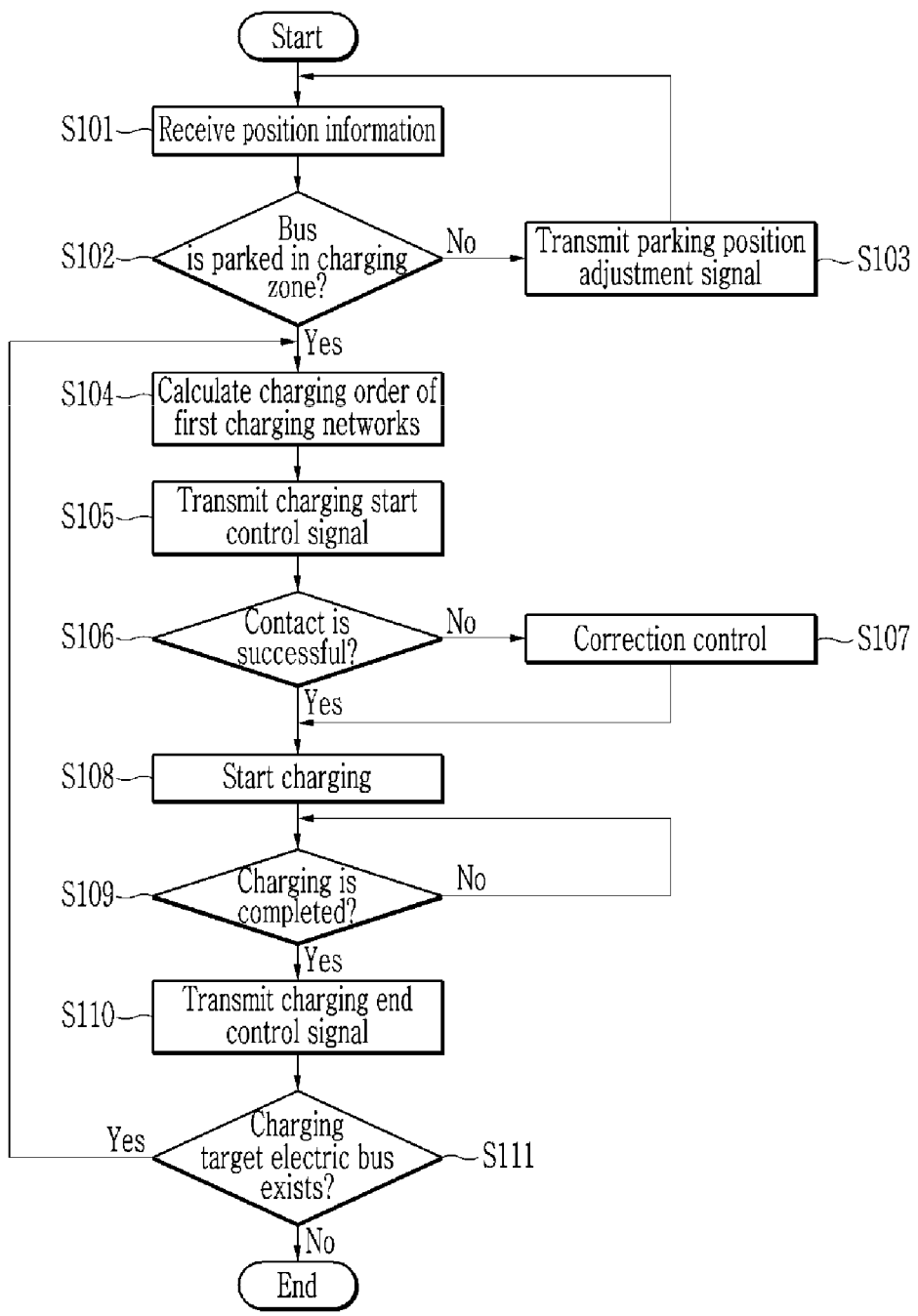
FIG. 6 illustrates a flowchart of a charging method for an electric bus according to an exemplary embodiment.

FIG. 6 illustrates a flowchart of a charging method for an electric bus according to an exemplary embodiment.

As illustrated in FIG. 6, the station controller 26 receives the location information from a plurality of electric buses 10 parked in the garage through the station communication module 25 (S101), and determines whether the electric bus 10 is parked and chargeable in the second charging network 24 (S102). For example, the station controller 26 displays positions of the electric buses 10 on a garage map and compares it with a charging zone map to distinguish the electric bus 10 that is chargeable from the electric bus 10 that is not chargeable.

When the electric bus 10 is not chargeable (S102, No), the station controller 26 transmits a parking position adjustment signal to the electric bus 10 (S103). Then, a driver or a manager who checks the parking position adjustment signal may move the electric bus 10 to the charging zone of the second charging network 24 to prepare for charging.

Next, when the electric bus 10 is chargeable (S102, Yes), the station controller 26 analyzes positions of the first charging networks 23 and the position information received from the electric buses 10 to calculate a shortest movement path of each of the first charging networks 23, and calculates the charging order of each of the first charging networks 23 by matching at least one electric bus 10 parked under the calculated shortest movement paths (S104). In this case, when the first charging networks 23 need to be moved for charging, the station controller 26 controls the first charging networks 23 to move such that the first pantograph 13 of the electric bus 10 is positioned under the area covered by the predetermined areas of the first charging networks 23 according to the calculated charging order.

Next, the station controller 26 transfers a charging start control signal to the electric bus 10 to enable the electric bus to extend the first pantograph 13 upward to contact the first charging network 23, and to extend the second pantograph 14 downward to contact the second charging network 24 (S105). Then, the electric bus 10 extends the first pantograph 13 upward to contact the first charging network 23, and extends the second pantograph 14 downward to contact the second charging network 24.

Next, the station controller 26 determines whether contacts of the first pantograph 13 and the second pantograph 14 are successful (S106). Specifically, the station controller 26 may check for itself whether the contacts of the first pantograph 13 and the second pantograph 14 are successfully made, or may receive ready signals corresponding to successful contacts of the first pantograph 13 and the second pantograph 14 from the electric bus 10.

Next, when the contacts of the first pantograph 13 and the second pantograph 14 fail (S106, No), the station controller 26 performs a correction control (S107).

For example, when the station controller 26 determines that the first charging networks 23 and the first pantograph 13 fail to contact each other, the station controller 26 controls the movement of the first charging network 23 to correct the position. When the station controller 26 determines that the second charging network 24 and the second pantograph 14 are not in contact with each other, the station controller 26 transfers a parking position adjustment signal to the electric bus 10 to correct the position by controlling the electric bus 10 to move.

Next, when the contacts of the first pantograph 13 and the second pantograph 14 are successfully made (S106, Yes), the station control unit 26 transfers a charging control signal to the power converter 21 to start the charging by allowing the charging power to be transferred to the electric bus 10 (S108).

Next, when the charging is complete (S109, Yes), the station controller 26 transmits a charging end control signal to the electric bus 10 to control the first pantograph 13 and the second pantograph 14 to be respectively separated from the first charging network 23 and the second charging network 24 (S110).

Next, the station controller 26 determines whether a next charging target electric bus 10 of the first charging network 23 exists (S111). If present (S111, Yes), the station control unit 26 repeats the above from step S104 to control the movement of the first charging network 23 to the corresponding position. If not present (S111, No), the charging ends.

The present disclosure can also be embodied as computer readable code/algorithm/software stored on a computer readable recording medium. The computer readable recording medium is any data storage device that can store data which can thereafter be read by a computer, a processor/microprocessor, and the aforementioned controller and/or components thereof. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The aforementioned controller and/or components thereof may include a computer, one or more processors/microprocessors, or a circuit, and a computer readable recording medium storing computer readable code/algorithm/software. Such a computer, processor(s)/microprocessor(s), or a circuit may perform the above described functions, operations, steps, etc., by executing the computer readable code/algorithm/software stored on the computer readable recording medium.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A charging system for electric buses, comprising:
a power converter configured to receive power from an external power network to generate charging power for the electric buses;
a plurality of power rails electrically connected to the power converter and installed at a predetermined height according to a layout of a garage;
a first charging network configured to move above a floor in the garage along the electric power rails to contact the electric buses at upper sides of the electric buses;
a second charging network electrically connected to the power converter and providing a charging zone on a bottom surface of the garage by reflecting the layout of the garage to contact the electric buses parked in the charging zone; and
a station controller configured to control a charging sequence of the electric buses by analyzing position information of the electric buses and calculating a shortest movement path and a charging order of the first charging network,
wherein the first charging network includes a plurality of first charging networks,
the station controller, when the electric bus is chargeable, analyzes a position of the first charging networks and position information of the electric buses to calculate a shortest movement path of each of the plurality of first charging networks, and matches at least one electric bus parked below the shortest movement path to calculate the charging order of each of the first charging networks,
the station controller transfers a charging start control signal to the electric bus to induce a first pantograph of the electric bus to expand upward to contact the first charging network and a second pantograph of the electric bus to extend downward to contact the second charging network,
the first pantograph contacts electrically a positive terminal of a battery and the second pantograph contacts electrically a negative terminal of the battery,
during the charging of the electric bus, the first pantograph is upwardly unfolded to directly contact a positive electrode of the charging station to receive charging power, and the second pantograph is downwardly unfolded to directly contact a negative electrode of the charging station so as to configure a closed loop path in which a charging current received from the charging station flows through the first pantograph.

2. The charging system of claim 1, wherein
the first charging network is configured to have a predetermined area, and opposite ends thereof are electrically connected to a pair of power rails installed at a predetermined height at opposite positions, respectively, to horizontally move above the floor in the garage opposite to the second charging network.

3. The charging system of claim 2, wherein
the station controller displays position information of the electric buses on a garage map, and compares the garage map with a map of the second charging network to determine a possibility of charging of the electric buses.

4. The charging system of claim 3, wherein
the station controller transfers a parking position adjustment signal to at least one of the electric buses when the at least one electric bus is not chargeable.

5. The charging system of claim 1, wherein
the station controller corrects a position by moving the first charging network when it is determined that the first charging network and the first pantograph fail to contact each other.

6. The charging system of claim 1, wherein
the station controller induces the parking position of the electric bus to be corrected by transmitting a parking position adjustment signal to the electric bus when it is determined that the second charging network and the second pantograph fail to contact each other.

7. The charging system of claim 1, wherein
the station controller controls the charging power to be received by the electric bus by transferring a charge control signal to the power converter when it is determined that the contact between the first pantograph and the first charging network and the contact between the second pantograph and the second charging network are successfully made.

8. A charging system for an electric bus, comprising:
a first pantograph configured to extend upward from an upper side of a roof to contact a first charging network of a charging station during charging and contact electrically a positive terminal of a battery;
a second pantograph configured to extend downward from an outer bottom surface to contact a second charging network of the charging station during charging and contact electrically a negative terminal of the battery when the electric bus is positioned in a charging zone constituting the second charging network;
a position sensor configured to generate position information of the electric bus;
a bus communication module configured to communicate with a charging station to transmit the position information to the charging station; and
a bus controller configured to transmit the position information through the bus communication module for charging and to control the first pantograph and the second pantograph depending on a control signal received from the charging station to charge the battery of the electric bus when the electric bus is parked,
wherein the first charging network is provided at an upper side of the electric bus and the second charging network is provided on a bottom surface of the charging zone,
during the charging of the electric bus, the first pantograph is upwardly unfolded to directly contact a positive electrode of the charging station to receive charging power, and
the second pantograph is downwardly unfolded to directly contact a negative electrode of the charging station so as to configure a closed loop path in which a charging current received from the charging station flows through the first pantograph.

9. The charging system of claim 8, wherein
the bus controller controls the electric bus to be parked in the second charging network when the electric bus is not parked in the second charging network and a parking position adjustment signal from the charging station is received.

10. A charging method for an electric bus, comprising:
receiving position information from a plurality of electric buses parked in a charging zone;
determining whether the electric buses are parked and are chargeable in a second charging network based on the position information;
calculating a charging order of each of a plurality of first charging networks depending on a result of the determining whether the charging is possible, and controlling the first charging networks to move according to the calculated charging order;
preparing for charging by transferring a charging start control signal to a corresponding electric bus among the plurality of the electric buses to induce a first pantograph connected electrically to a positive terminal of a battery of the corresponding electric bus to expand upward to contact at least one of the first charging networks and a second pantograph connected electrically to a negative terminal of the battery of the corresponding electric bus to extend downward to contact a second charging network which is constituted by the charging zone;
starting charging by transferring a charge control signal to a power converter so that charging power is received by the corresponding electric bus when contacts of the first pantograph and the second pantograph are made; and
ending the charging by transferring a charging end control signal to the corresponding electric bus to control the first pantograph and the second pantograph to be respectively separated from the at least one of the first charging networks and the second charging network when the charging is completed,
wherein the first charging network is provided at upper sides of the plurality of electric buses and the second charging network is provided on a bottom surface of the charging zone,
during the charging of the electric bus, the first pantograph is upwardly unfolded to directly contact a positive electrode of the charging station to receive charging power, and
the second pantograph is downwardly unfolded to directly contact a negative electrode of the charging station so as to configure a closed loop path in which a charging current received from the charging station flows through the first pantograph.

11. The charging method of claim 10, wherein
the determining includes displaying the position information of the plurality of electric buses on a garage map and comparing the garage map with a map of the second charging network to determine a possibility of charging of the plurality of electric buses.

12. The charging method of claim 11, further comprising, after the determining, transmitting a parking position adjustment signal to at least one of the plurality of electric buses when it is determined that the at least one electric bus is not chargeable.

13. The charging method of claim 12, wherein
the controlling of the first charging networks to move includes analyzing a position of the plurality of first charging networks and the position information of the plurality of electric buses to calculate a shortest movement path of each of the plurality of first charging networks, and matches at least one electric bus parked below the shortest movement path to calculate the charging order of each of the first charging networks.

14. The charging method of claim 13, wherein
the controlling of the first charging networks to move includes controlling the movement of the plurality of first charging networks such that the first pantograph of the electric bus is positioned under an area covered by the predetermined area of the plurality of first charging networks.

15. The charging method of claim 14, further comprising,
before the starting of charging, determining whether the one of the first charging networks and the second charging network successfully contact the first pantograph and the second pantograph, respectively.

16. The charging method of claim 15, further comprising
correction control for correcting a position by moving the one of the plurality of first charging networks when it is determined that the contact fails between the one of the plurality of first charging networks and the first pantograph in the determining.

17. The charging method of claim 15, wherein
the correction control further includes inducing the parking position of the electric bus to be corrected by transmitting a parking position adjustment signal to the electric bus when it is determined that the second charging network and the second pantograph fail to contact each other in the determining.

* * * * *